(12) United States Patent
Fujimoto et al.

(10) Patent No.: US 10,298,162 B2
(45) Date of Patent: May 21, 2019

(54) BRUSHLESS-MOTOR DRIVE APPARATUS

(75) Inventors: Chiaki Fujimoto, Tokyo (JP);
Masahiro Kimata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 43 days.

(21) Appl. No.: 13/640,250

(22) PCT Filed: May 14, 2010

(86) PCT No.: PCT/JP2010/058207
§ 371 (c)(1),
(2), (4) Date: Oct. 9, 2012

(87) PCT Pub. No.: WO2011/142032
PCT Pub. Date: Nov. 17, 2011

(65) Prior Publication Data
US 2013/0026960 A1    Jan. 31, 2013

(51) Int. Cl.
*H02P 21/06* (2016.01)

(52) U.S. Cl.
CPC .................................... *H02P 21/06* (2013.01)

(58) Field of Classification Search
CPC ....................................................... H02P 21/06
(Continued)

(56) References Cited

U.S. PATENT DOCUMENTS

| | | | | |
|---|---|---|---|---|
| 4,677,361 A * | 6/1987 | Yonemoto | ............... | H02P 21/10 187/296 |
| 5,189,349 A * | 2/1993 | Haga | ......................... | H02P 6/06 318/257 |

(Continued)

FOREIGN PATENT DOCUMENTS

| | | | |
|---|---|---|---|
| CN | 103287789 A | * | 9/2013 |
| EP | 1526060 A2 | | 4/2005 |

(Continued)

OTHER PUBLICATIONS

Japanese Office Action dated Jul. 9, 2013 in Japanese Patent Application No. 2010-514659.
(Continued)

*Primary Examiner* — Eduardo Colon Santana
*Assistant Examiner* — Devon A Joseph
(74) *Attorney, Agent, or Firm* — Sughrue Mion, PLLC; Richard C. Turner

(57) ABSTRACT

Disclosed is a brushless-motor drive apparatus provided with: a current detecting means (6) for detecting currents flowing through armature windings (9) during periods when switching elements (5H, 5L) of a drive circuit are ON; a calculation processing means for comparing a target current value and the detected current value, and calculating voltage command values to be applied to the armature windings (9); and a PWM driving means (4) for controlling the ON/OFF of the switching elements on the basis of the voltage command values. The calculation processing means is further provided with a current-detection possibility evaluating means for evaluating whether or not the currents flowing through the armature windings (9) can be detected, with the operating states of the switching elements of each of the phases, and when the current-detection possibility evaluating means evaluates that the currents cannot be detected, the calculation processing means obtains the voltage command values using the current values detected when the currents are able to be detected, and continues the motor drive.

15 Claims, 14 Drawing Sheets

(58) Field of Classification Search
USPC .............................. 318/432, 400.05; 180/446
See application file for complete search history.

(56) References Cited

U.S. PATENT DOCUMENTS

| | | | | |
|---|---|---|---|---|
| 5,196,771 | A * | 3/1993 | Naito | 318/400.36 |
| 6,411,237 | B1 * | 6/2002 | Lautzenhiser | H03L 7/189 |
| | | | | 341/144 |
| 6,556,458 | B2 * | 4/2003 | Ohmura | H02M 7/53873 |
| | | | | 363/37 |
| 6,838,844 | B2 * | 1/2005 | Shimizu | B62D 5/046 |
| | | | | 180/410 |
| 7,040,450 | B2 * | 5/2006 | Nagase | B62D 5/046 |
| | | | | 180/443 |
| 7,746,023 | B2 * | 6/2010 | Ajima et al. | 318/700 |
| 8,159,163 | B2 * | 4/2012 | Akiyama | H02P 21/14 |
| | | | | 318/400.04 |
| 8,217,600 | B2 * | 7/2012 | Sakai | 318/400.05 |
| 2003/0085678 | A1 * | 5/2003 | Yamada | H02P 21/22 |
| | | | | 318/400.02 |
| 2003/0107339 | A1 * | 6/2003 | Shimizu | B62D 5/046 |
| | | | | 318/434 |
| 2005/0179428 | A1 * | 8/2005 | Hiramine et al. | 324/177 |
| 2005/0231145 | A1 * | 10/2005 | Mukai et al. | 318/432 |
| 2007/0152676 | A1 * | 7/2007 | Lee | H02P 23/0004 |
| | | | | 324/522 |
| 2008/0079385 | A1 * | 4/2008 | Hashimoto et al. | 318/801 |
| 2009/0066286 | A1 * | 3/2009 | Gunji | B62D 5/0487 |
| | | | | 318/490 |
| 2009/0073617 | A1 * | 3/2009 | Gunji | H02P 29/0241 |
| | | | | 361/23 |
| 2010/0127648 | A1 * | 5/2010 | Akiyama | H02P 21/14 |
| | | | | 318/400.11 |
| 2010/0158055 | A1 * | 6/2010 | Giebel | G06K 7/10584 |
| | | | | 372/29.011 |
| 2010/0320950 | A1 | 12/2010 | Inoue et al. | |
| 2011/0043144 | A1 * | 2/2011 | Ueda | B62D 5/046 |
| | | | | 318/400.02 |
| 2011/0148336 | A1 * | 6/2011 | Hayashi | H02P 21/0003 |
| | | | | 318/400.04 |
| 2012/0139459 | A1 * | 6/2012 | Lim | H02P 21/0017 |
| | | | | 318/400.02 |
| 2012/0146683 | A1 * | 6/2012 | Tanimoto | B60L 3/0061 |
| | | | | 324/765.01 |
| 2013/0099707 | A1 * | 4/2013 | Okubo | 318/400.23 |
| 2013/0271057 | A1 * | 10/2013 | Ploucha et al. | 318/565 |
| 2016/0065854 | A1 * | 3/2016 | Kim | G03B 5/00 |
| | | | | 348/208.2 |

FOREIGN PATENT DOCUMENTS

| | | | | |
|---|---|---|---|---|
| JP | 2003-189670 A | | 7/2003 | |
| JP | 2005-1574 A | | 1/2005 | |
| JP | 2005-001574 A | | 1/2005 | |
| JP | 4140454 B2 | | 8/2008 | |
| JP | 2009-071971 A | | 4/2009 | |
| JP | 5189349 B2 * | | 4/2013 | |
| KR | 20100127648 A * | | 12/2010 | |
| KR | 20120066355 A * | | 6/2012 | ......... F16C 33/7813 |
| KR | 101236837 B1 * | | 2/2013 | ......... F16C 33/7813 |
| WO | 2009/113509 A1 | | 9/2009 | |

OTHER PUBLICATIONS

Communication dated Feb. 5, 2014 from the European Patent Office in counterpart application No. 10851415.9.

* cited by examiner

BRUSHLESS-MOTOR DRIVE APPARATUS

CROSS REFERENCE TO RELATED APPLICATIONS

This application is a National Stage of International Application No. PCT/JP2010/058207, filed on May 14, 2010, the contents of all of which are incorporated herein by reference in their entirety.

TECHNICAL FIELD

The present invention relates to a brushless-motor drive apparatus configured to control driving of a brushless motor using phase currents flowing through armature windings of the brushless motor.

BACKGROUND ART

In a motor drive apparatus that performs feedback control on an output of a brushless motor according to armature currents flowing through armature windings of the motor, currents flowing through current detection resistors provided phase by phase to a motor drive inverter circuit are detected as armature currents in the respective phases. A duty ratio corresponding to a deviation between a target current and the detection current is calculated phase by phase and ON/OFF control is performed on switching elements of the respective phases forming the inverter circuit by PWM control. Owing to this configuration, phase voltages to be applied to the armature windings of the respective phases are changed and drive currents are flown through the armature windings of the respective phases. Hence, a motor output is controlled.

FIG. 14 is a view of a circuit configuration showing an example of a brushless-motor drive apparatus in the related art described, for example, in Patent Document 1.

As is shown in FIG. 14, the brushless-motor drive apparatus in the related art is configured in such a manner that upper switching elements 5uH, 5vH, and 5wH (hereinafter, also collectively denoted simply by 5H), armature windings 9, and lower switching elements 5uL, 5vL, and 5wL (hereinafter, also collectively denoted simply by 5L) are interconnected phase by phase and current detection resistors 6u, 6v, and 6w (hereinafter, also collectively denoted simply by 6) are disposed between the lower switching elements 5L and a ground. In order to detect currents flowing through the current detection resistors 6, a state of the switching elements is changed so that the lower switching elements 5L are ON by a drive control circuit 4 that is a PWM control means. In this instance, armature currents of the armature windings 9 of the motor pass through the lower switching elements 5L and the current detection resistors 6 and flow to the ground. The armature currents are measured by detecting potential differences across the current detection resistors 6 in this state in which currents flow through the current detection resistors 6.

When the lower switching elements 5L are ON, the upper switching elements 5H are OFF so that currents are prevented from flowing through the upper and lower switching elements of the same phases by flowing currents through the armature windings 9. In this manner, the armature currents can be detected only when the upper switching elements 5H are OFF and the lower switching elements 5L are ON.

Conversely, in a case where ON/OFF control is performed on the switching elements 5H and 5L with PWM control signals of the drive control circuit 4, there is a period during which no currents flow through the current detection resistors 6. Accordingly, there is a circumstance where currents cannot be detected properly. To overcome this inconvenience, it is necessary to limit duty ratios of the PWM control signals, that is, voltages to be applied to the armature windings 9. Hence, the motor has to be used by lowering a utilization ratio of a power supply voltage due to the duty ratios and a motor performance is limited.

Under these circumstances, Patent Document 1 describes as follows. That is, for a brushless motor formed of a phase U, a phase V, and a phase W, in a case where ON/OFF control is performed on switching elements of the respective phase U, phase V, and phase W according to instructions of the duty ratios from the PWM control means, it becomes difficult to detect a current in the phase U when the switching elements of the phase U are switched ON/OFF at a duty ratio lower than a predetermined value. Hence, a current Iu in the phase U is calculated in accordance with Equation (1) below from a detected current Iv in the phase V and a detected current Iw in the phase W:

$$Iu = -(Iv + Iw) \qquad (1).$$

Also, it is described that in a case where the switching elements of the other phase V or W are switched ON/OFF at a duty ratio lower than the predetermined value, a current is calculated using the currents detected in the other phases in the same manner.

RELATED ART LIST

Patent Document

Patent Document 1: Japanese Patent No. 4140454

SUMMARY OF THE INVENTION

Problems to be Solved by the Invention

In the related art described above, when a duty ratio of a given phase is lower than the predetermined value, for example, in a state in which a duty ratio of the phase U is lower than the predetermined value, a U-phase current cannot be detected directly. Accordingly, the U-phase current is calculated by detecting currents in the other phases, that is, V-phase and W-phase currents. It should be noted, however, that the other phases, the phase V and the phase W, in this instance have to be in a state in which currents can be detected without fail. In other words, it is required that duty ratios of two phases out of three phases be equal to or higher than the predetermined value. Hence, duty ratios are limited to a range within which currents can be detected and this limitation raises a problem that duty ratios cannot be controlled as desired.

The invention is devised to solve the problems as discussed above and has an object to provide a brushless-motor drive apparatus capable of driving a motor independently of a state in which armature currents can be detected and enhancing a motor output by eliminating a need to limit duty ratios and hence by becoming capable of applying voltages to armature windings of the motor as desired.

Means for Solving the Problems

A brushless-motor drive apparatus of the invention is provided with: a drive circuit of a brushless motor having a plurality of parallel-connected arms including switching element pairs formed of first (upper) switching elements disposed on a power supply side and second (lower) switching elements disposed on a ground side connected in series in each pair; a current detecting means for detecting currents flowing through armature windings of the brushless motor during periods when the switching elements of the drive circuit are ON; a calculation processing means for comparing a target current value to drive the brushless motor and detection current values detected by the current detecting means, and calculating voltage command values to be applied to the armature windings of the brushless motor on the basis of deviations; and a PWM driving means for controlling ON/OFF of the switching elements of the drive circuit by generating drive signals on the basis of the voltage command values from the calculation processing means. The calculation processing means is further provided with a current-detection possibility evaluating means for evaluating whether or not the currents flowing through the armature windings of respective phases of the brushless motor can be detected according to operating states of the switching elements of the respective phases of the drive circuit. When the current-detection possibility evaluating means evaluates that the currents cannot be detected, the calculation processing means obtains the voltage command values by making a comparison with the target current value using detection current values detected before and continues a motor drive.

Advantage of the Invention

According to the brushless-motor drive apparatus of the invention, it becomes possible to obtain a brushless-motor drive apparatus capable of driving the motor independently of a state in which armature currents can be detected and enhancing a motor output by eliminating a need to limit duty ratios and hence by increasing a utilization ratio of a power supply voltage.

The foregoing and other objects features, aspects, and advantages of the present invention will become more apparent from the following detailed description of the present invention when taken conjunction with the accompanying drawings.

MODE FOR CARRYING OUT THE INVENTION

First Embodiment

Figure 1:
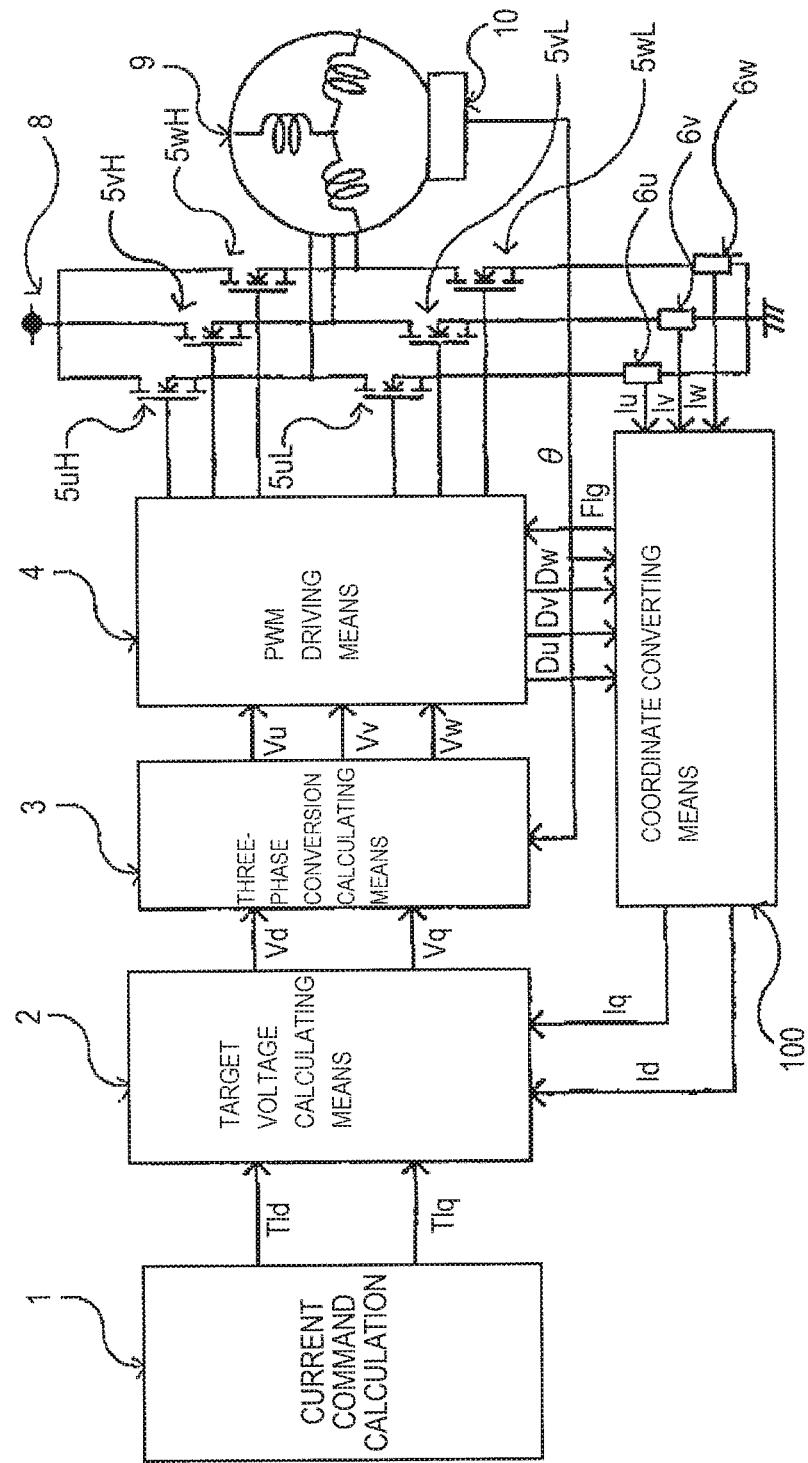
FIG. 1 is a view schematically showing a configuration of a brushless-motor drive apparatus according to a first embodiment of the invention.

Hereinafter, a brushless-motor drive apparatus according to a first embodiment of the invention will be described with reference to the drawings. FIG. 1 is a view schematically showing a configuration of the brushless-motor drive apparatus of the first embodiment. Referring to FIG. 1, a brushless motor is formed of a three-phase synchronous permanent magnet motor having armature windings 9 and includes a position sensor 10 formed, for example, of a resolver, that detects a magnetic pole position of the motor. Magnetic pole position information of the motor is outputted by the position sensor 10 to a control portion (controller) described below.

A drive circuit that drives the brushless motor is formed of, as is known, FETs (Field Effect Transistors) 5H (5uH, 5vH, and 5wH) that are first switching elements disposed on a side of a power supply 8 and FETs 5L (5uL, 5vL, and 5wL) that are second switching elements disposed on a grounding side, which are connected in series in pairs. Connection points of the FETs 5H and 5L in respective pairs are connected to respective phases of the armature windings 9 of the motor. Conduction and non-conduction of the respective FETs 5H and 5L are controlled according to drive signals from a PWM drive means 4, so that the motor is driven by controlling applied voltages to the motor armature windings 9.

Current detection resistors 6 (6u, 6v, and 6w) that are current detecting means are connected between the lower FETs 5 (5uL, 5vL, and 5wL) and the ground. A specific operation of current detection will be described below.

A calculation processing means that is a control portion of the motor is formed of a micro-computer and calculates a motor position θ upon input of a signal from the position sensor 10 that detects a rotation position of the motor.

Also, currents flowing through the respective phases U, V, and W of the armature windings 9 are inputted from the current detecting means 6 that detect currents flowing through the respective phases of the brushless motor.

Hereinafter, respective portions of the calculation processing means will be described.

Currents Iu, Iv, and Iw from the current detecting means 6 are inputted into a coordinate converting means 100. The coordinate converting means 100 obtains detection currents Iq and Id of two axes, a q axis and a d axis, respectively, from the motor position θ and the U-, V-, and W-phase detection currents by dq conversion. Also, a target current command calculating means 1 of the motor calculates and outputs a target q-axis current TIq and a target d-axis current TId that are specified currents for a motor drive.

A deviation between the target q-axis current TIq from the target current command calculating means 1 and an actually detected q-axis current Iq is calculated by PI control by a proportional-integral calculating means 2 that is a target voltage calculating means to obtain a command voltage Vq of the q axis. Likewise, a deviation between the target d-axis current TId and the detection d-axis current Id is calculated by PI control to obtain a d-axis command voltage Vd.

The q-axis command voltage Vq and the d-axis command voltage Vd calculated in the proportional-integral calculating means 2 are inputted into a three-phase conversion calculating means 3. The three-phase conversion calculating means 3 performs three-phase conversion, that is, dq inverse conversion and thereby converts the d- and q-axis command voltages to voltage command values Vu, Vv, and Vw to be applied, respectively, to the armature windings of three phases U, V, and W of the motor.

The voltage command values Vu, Vv, and Vw are inputted into the PWM driving means 4 that is a control means of the drive circuit. The PWM driving means 4 substitutes duty ratios for the three-phase voltage command values and then applies pulse width modulation to provide drive instructions to FET drive circuits. The FET drive circuits achieve chopper control upon receipt of drive signals from the PWM driving means 4. Consequently, currents are flown through the respective phases of the armature windings 9 of the brushless motor and the brushless motor rotates by generating a torque.

Figure 2:
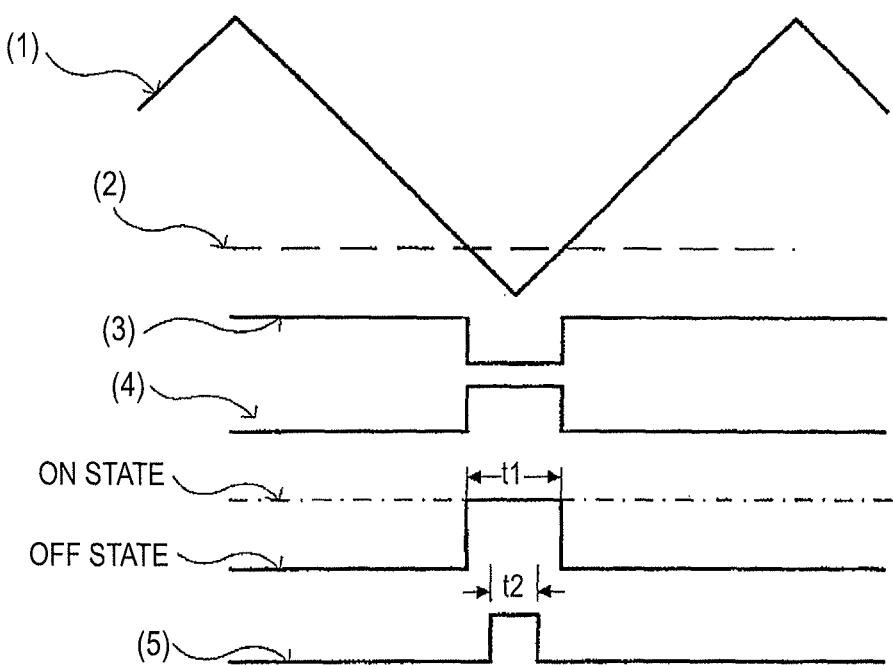
FIG. 2 is a time chart used to describe an operation of current detecting means in the first embodiment of the invention.

A specific operation of current detection in the current detecting means 6u, 6v, and 6w will now be described with reference to FIG. 2. In FIG. 2, (1) denotes a timer indicating a carrier in pulse width modulation (PWM) and a duty ratio (2) is shown by setting a minimum state to 0% and a maximum state to 100%.

When the carrier (1) exceeds the duty ratio (2), a signal (3) switches ON the FETs 5H disposed on the upper row whereas a signal (4) switches OFF the FETs 5L disposed on the lower row. Conversely, when the carrier (1) drops below the duty ratio (2), the signal (3) switches OFF the FETs 5H disposed on the upper row whereas the signal (4) switches ON the FETs 5L disposed on the lower row.

By controlling an ON/OFF time ratio in this manner, voltages applied to the armature windings 9 are controlled.

Figure 3:
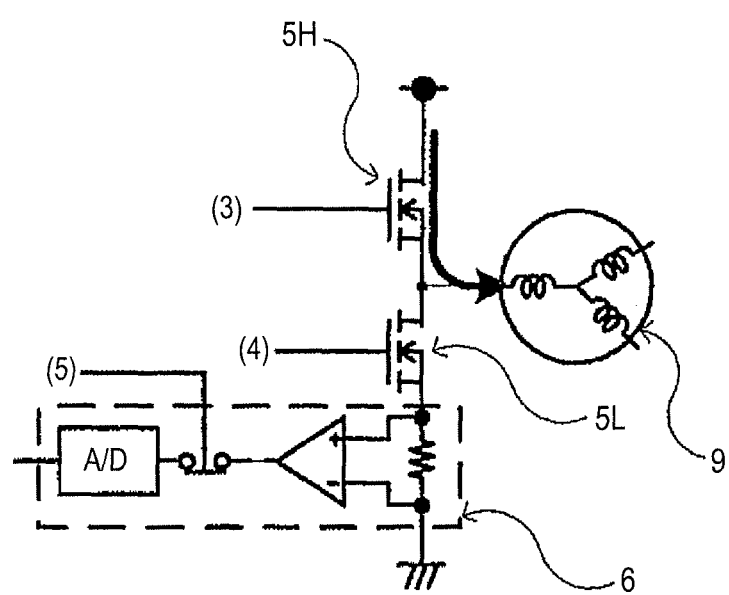
FIG. 3 shows driving of an upper FET in the first embodiment of the invention.
Figure 4:
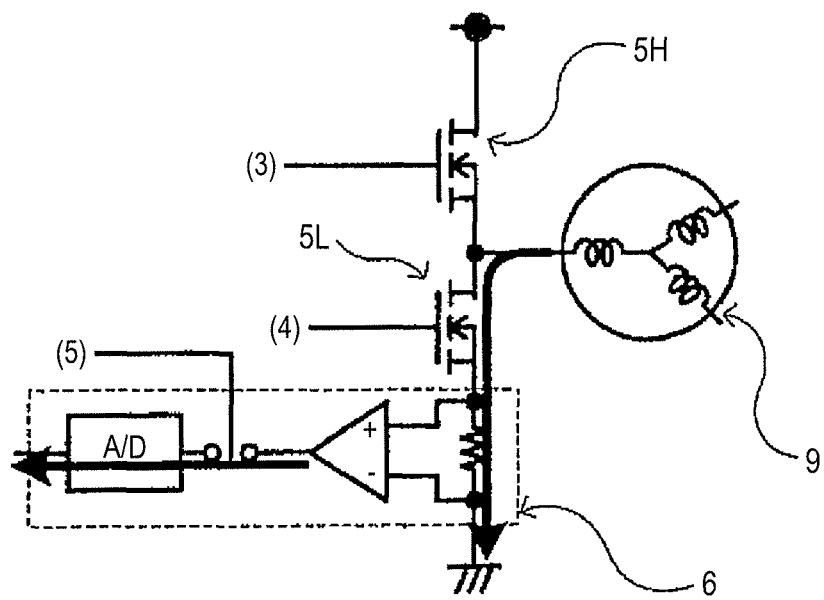
FIG. 4 shows driving of a lower FET in the first embodiment of the invention.

As is shown in FIG. 3, for the current detection, a state in which the upper FET is switched ON and the lower FET is switched OFF by the signals (3) and (4) described above is defined as an OFF state, during which current detection cannot be performed because currents flowing through the armature windings 9 do not pass through the current detecting means 6. Conversely, as is shown in FIG. 4, a state in which the upper FET is switched OFF and the lower FET is switched ON is defined as an ON state, during which current detection can be performed because currents flowing through the armature windings 9 pass through the current detecting means 6. Hence, it is necessary to detect currents in the current detection circuits during the ON state.

In the current detecting means 6 of FIG. 4, for a sample-and-hold instructing signal to extract a current detection value alone, it is necessary to hold and sample the current detection value during an ON state, that is, within a time t1 of FIG. 2. Because the sample-and-hold time t2 is determined by a sampling-and-holding means, $t1 \geq t2$ is required for current detection to be performed.

More specifically, regarding evaluations as to whether or not a current can be detected, it is evaluated that a current can be detected when the ON state period t1 is larger than t2 and it is evaluated that a current cannot be detected when the ON state period t1 is shorter than t2.

The ON state period t1 indicates an ON time of the lower FET 5L, and given that a carrier cycle T of PWM is fixed, then t1 can be determined from the duty ratio. Hence, a duty ratio with which a current can be detected is t2/T or higher and it can be said that a state in which a duty ratio is t2/T or higher is a current detectable state. Conversely, a state in which the duty ratio is less than t2/T can be evaluated as a current undetectable state. Further, because duty ratios can be obtained from command voltages (voltage command values) of the respective phases, it is possible to evaluate whether or not currents can be detected in the respective phases from duty ratios that the respective phases specify or the command voltages of the respective phases.

Also, in the above description, whether or not currents can be detected is evaluated from the specified duty ratios or the command voltages. However, voltages on the armature windings fluctuate to a power supply voltage and a ground voltage due to the upper and lower FETs 5H and 5L. Hence, whether or not currents can be detected may be evaluated by detecting this voltage fluctuation to measure a time during which the voltages on the armature windings are in a state on the ground side, and by evaluating whether the measured time is equal to or longer than t2. Further, whether or not currents can be detected may be evaluated by measuring a time during which the voltages on the armature windings are in a state on the ground side and a time during which the voltages are in a state on the power supply side and by calculating an actual duty ratio by obtaining a ratio of the measured times.

Furthermore, duty ratios can be calculated by detecting voltages on the armature windings and a power supply voltage and by obtaining ratios of the former and the latter. Whether or not currents can be detected may be evaluated from these duty ratios.

Figure 5:
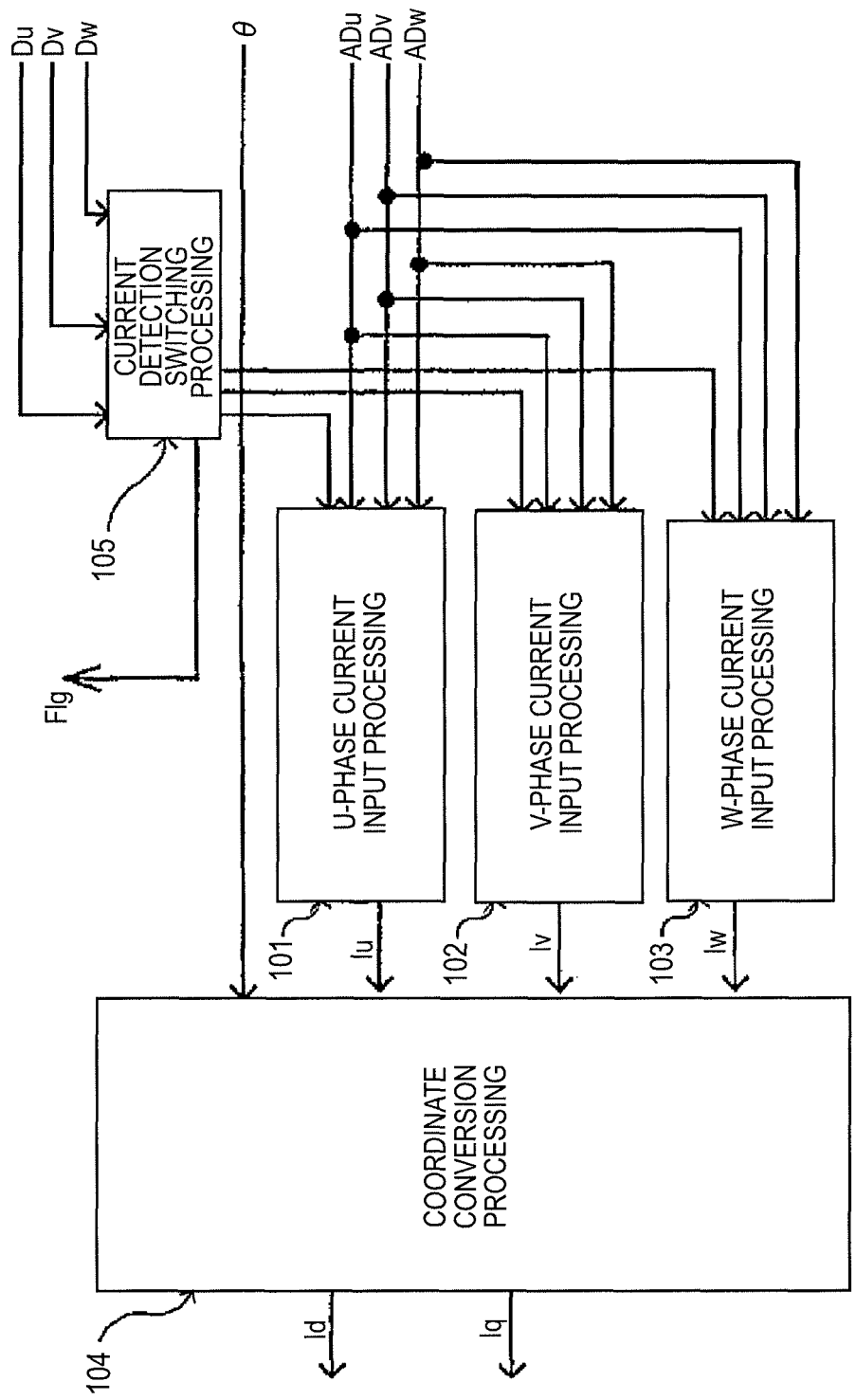
FIG. 5 is a detailed control block diagram of a coordinate converting means in the first embodiment of the invention.

The coordinate converting means 100 that is a major portion of the invention will now be described in detail on the basis of FIG. 5. Referring to FIG. 5, a current detection switching processing portion 105 outputs instructing signals to switch the currents detected in the respective phases in addition to processing to evaluate whether or not currents can be detected in the respective phases as described above. When a current can be detected in the phase U, a U-phase current input processing portion 101 outputs a detection current ADu inputted therein intact as Iu. When it is evaluated that a current cannot be detected in the phase U, Iu expressed by Equation (2) below is outputted:

$$Iu = -(ADv + ADw) \qquad (2).$$

The same applies to a V-phase current input processing portion 102, and when a current can be detected in the phase V, a detection current ADv inputted therein is outputted intact as Iv.

When it is evaluated that a current cannot be detected in the phase V, Iv expressed by Equation (3) below is outputted:

$$Iv = -(ADu + ADw) \qquad (3).$$

The same also applies to a W-phase current input processing portion 103, and when a current can be detected in the phase V, a detection current ADw inputted therein is outputted intact as Iw. When it is evaluated that a current cannot be detected in the phase W, Iw expressed by Equation (4) below is outputted:

$$Iw = -(ADu + ADv) \qquad (4).$$

In a case where there is only one phase in which a current can be detected or currents cannot be detected in all the phases, the current detection switching processing portion 105 outputs phase currents calculated before as currents in the respective phases.

Equation (5) below is calculated using the phase currents Iu, Iv, and Iw obtained from the respective phases as above and the d- and q-axis detection currents denoted by Id and Iq, respectively, are outputted.

[Mathematical Formula 1]

$$\begin{bmatrix} Id \\ Iq \end{bmatrix} = \sqrt{\frac{2}{3}} \begin{bmatrix} \cos\theta & \cos\left(\theta - \frac{2}{3}\pi\right) & \cos\left(\theta + \frac{2}{3}\pi\right) \\ -\sin\theta & -\sin\left(\theta - \frac{2}{3}\pi\right) & -\sin\left(\theta + \frac{2}{3}\pi\right) \end{bmatrix} \begin{bmatrix} Iu \\ Iv \\ Iw \end{bmatrix} \quad (5)$$

Figure 6:
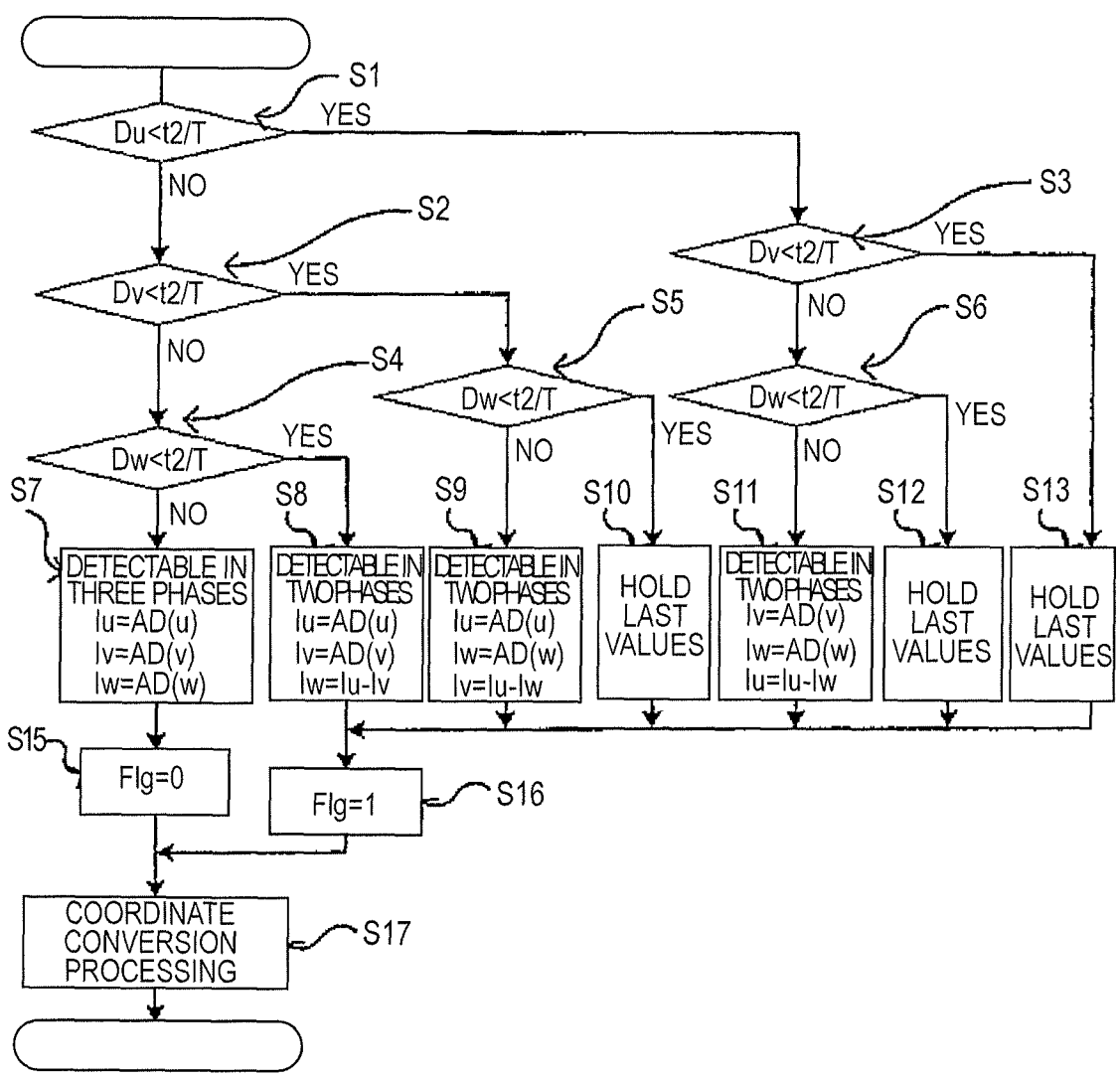
FIG. 6 is a flowchart depicting processing of current detection in the first embodiment of the invention.

The processing above is depicted by the flowchart of FIG. 6.

In Step S1, a duty ratio of the phase U, Du, is compared with t2/T to evaluate whether or not a current can be detected. When a current can be detected, the flow proceeds to Step S2. When it is evaluated that a current cannot be detected, the flow proceeds to Step S3.

In Step S2, a duty ratio of the phase V, Dv, is compared with t2/T to evaluate whether or not a current can be detected. When a current can be detected, the flow proceeds to Step S4. When it is evaluated that a current cannot be detected, the flow proceeds to Step S5.

In Step S3, the duty ratio of the phase V, Dv, is compared with t2/T to evaluate whether or not a current can be detected. When a current can be detected, the flow proceeds to Step S6. When it is evaluated that a current cannot be detected, the flow proceeds to Step S13.

In Step S4, a duty ratio of the phase W, Dw, is compared with t2/T to evaluate whether or not a current can be detected. When a current can be detected, the flow proceeds to Step S7. When it is evaluated that a current cannot be detected, the flow proceeds to Step S8.

In Step S5, the duty ratio of the phase W, Dw, is compared with t2/T to evaluate whether or not a current can be detected. When a current can be detected, the flow proceeds to Step S9. When it is evaluated that a current cannot be detected, the flow proceeds to Step S10.

In Step S6, the duty ratio of the phase W, Dw, is compared with t2/T to evaluate whether or not a current can be detected. When a current can be detected, the flow proceeds to Step S11. When it is evaluated that a current cannot be detected, the flow proceeds to Step S12.

In Step S7, because currents in all the three phases can be detected, signals ADu, Adv, and ADw detected by the current detecting means are used intact.

In Step S8, because a current in the phase W cannot be detected, a current in the phase W is calculated in accordance with Equation (4) above. For currents in the other phases U and V, signals ADu and ADv detected by the current detecting means are used intact.

In Step S9, because a current in the phase V cannot be detected, a current in the phase V is calculated in accordance with Equation (3) above. For currents in the other phases U and W, signals ADu and ADw detected by the current detecting means are used intact.

In Step S10, it is found that currents in two phases cannot be detected, that is, a current only in one phase can be detected. Hence, last values of the detection currents in the respective phases are used.

In Step S11, because a current in the phase U cannot be detected, a current in the phase U is calculated in accordance with Equation (2) above. For currents in the other phases V and W, signals ADv and ADw detected by the current detecting means are used intact.

In Step S12, it is found that current in two phases cannot be detected, that is, a current only in one phase can be detected. Hence, last values of the detection currents in the respective phases are used.

In Step S13, it is found that currents in two or more phases cannot be detected, that is, currents in two phases or in all the phases cannot be detected. Hence, last values of the detection currents in the respective phases are used.

In Step S15, Flg=0 is set to indicate a state in which currents can be detected.

In Step S16, Flg=1 is set to indicate the presence of a state in which a current cannot be detected.

In Step S17, Equation (5) above is calculated from detection currents in the three phases.

As has been described, a brushless-motor drive apparatus of the first embodiment is furnished with: a drive circuit of a brushless motor having a plurality of parallel-connected arms including switching element pairs formed of first (upper) switching elements disposed on a power supply side and second (lower) switching elements disposed on a ground side connected in series in each pair; a current detecting means for detecting currents flowing through armature windings of the brushless motor during periods when the switching elements of the drive circuit are ON; a calculation processing means for comparing a target current value to drive the brushless motor and detection current values detected by the current detecting means, and calculating voltage command values to be applied to the armature windings of the brushless motor on the basis of deviations; and a PWM driving means for controlling ON/OFF of the switching elements of the drive circuit by generating drive signals on the basis of the voltage command values from the calculation processing means. The calculation processing means is further provided with a current-detection possibility evaluating means for evaluating whether or not the currents flowing through the armature windings of respective phases of the brushless motor can be detected according to operating states of the switching elements of the respective phases of the drive circuit. When the current-detection possibility evaluating means evaluates that the currents cannot be detected, the calculation processing means obtains the voltage command values by making a comparison with the target current value using detection current values detected before and continues a motor drive. Hence, there is no need to limit duty ratios of the respective phases to a range within which the currents can be detected. Consequently, duty ratios can be used to the greatest extent possible.

Also, the brushless motor has armature windings formed of n phases, and when the current-detection possibility evaluating means evaluates that phases in which currents can be detected are (n−2) phases or less, the calculation processing means obtains the voltage command values by comparing phase current detection values and the target current value using phase current detection values obtained when all phase currents are detected and continues the motor drive. Hence, for example, even in a case where a current in only one phase can be detected and currents in the respective phases cannot be estimated, it becomes possible to drive the motor independently of a state in which currents cannot be detected. Accordingly, a need to limit duty ratios can be eliminated.

Incidentally, in a circumstance where a current cannot be detected, command voltages of the phases U, V, and W are required to increase with an increase of target voltages of the d- and q-axes. In other words, in a circumstance where a voltage rise occurs in the armature windings of the motor, the motor rotates and a back electromotive force is generated according to a rotation speed, so that inductive voltages in the respective phases increase. Hence, a circumstance where currents cannot be detected due to a failure of the motor drive apparatus can be avoided by detecting a rotation state of the motor.

In other words, in a circumstance where currents cannot be detected, when the motor rotation speed is equal to or below a predetermined value, the motor drive is stopped. Owing to this configuration, it becomes possible to stop the motor drive by detecting an abnormality in the motor drive apparatus.

Figure 7:
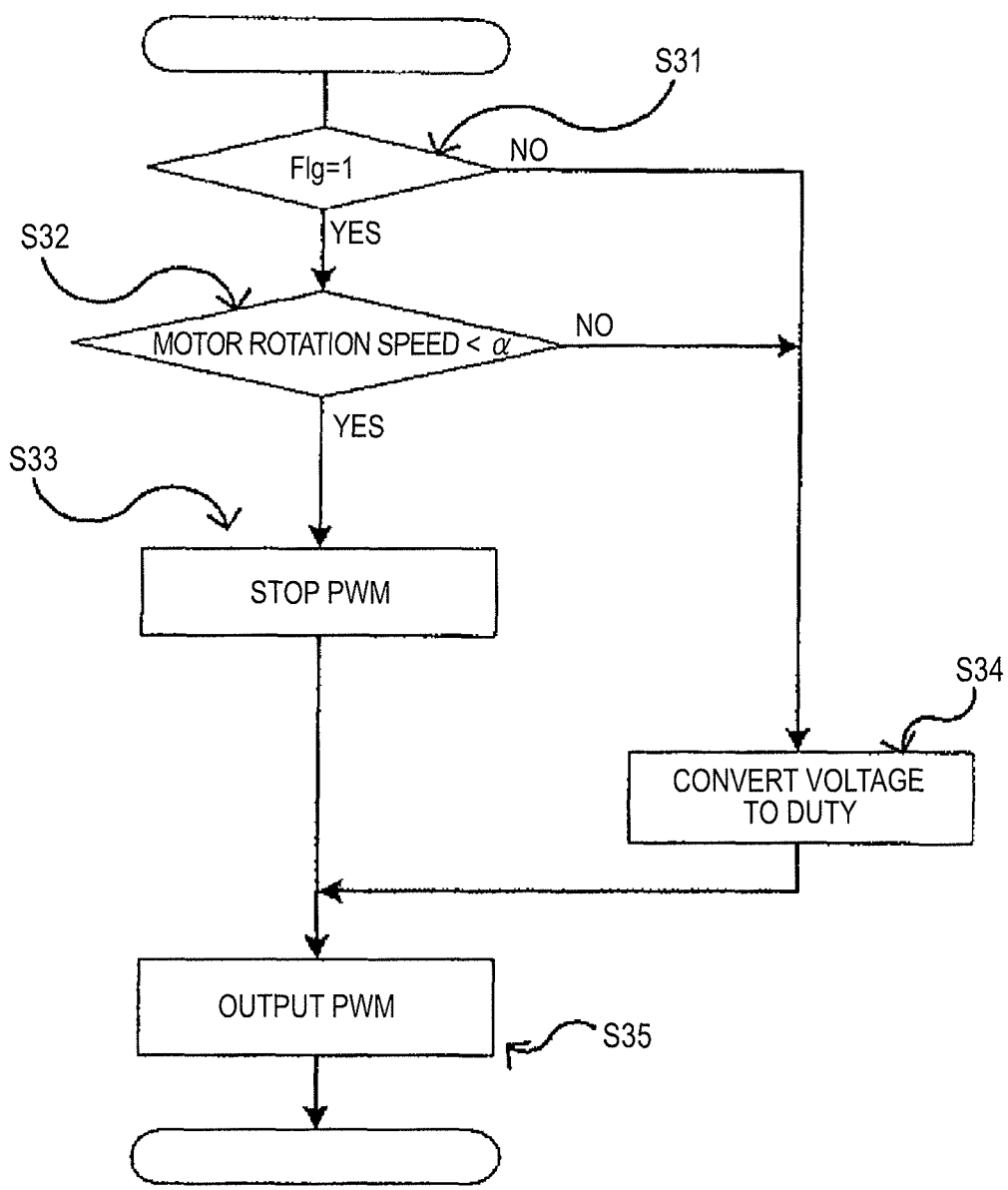
FIG. 7 is a flowchart depicting processing at the occurrence of an abnormality in the motor drive apparatus according to the first embodiment of the invention.

The content described above is processed in the PWM driving means 4 on the basis of the processing in FIG. 6, and the processing of the content is depicted by the flowchart of FIG. 7.

Referring to FIG. 7, the current undetectable state flag Flg obtained by the processing in FIG. 6 is checked. When the flag exhibits a current detectable state, the flow proceeds to Step S34. When the flag exhibits a current undetectable state, the flow proceeds to Step S32.

In Step S32, whether or not the motor rotation speed is equal to or higher than a predetermined value a is evaluated. When the motor rotation speed is equal to or higher than the predetermined value, the flow proceeds to Step S34. When the motor rotation speed is below the predetermined value α, the flow proceeds to Step S33.

In Step S33, an abnormality is evaluated and it is instructed to stop PWM control.

In Step S34, the specified respective phase voltages are converted to duties to enable PWM control.

In Step S35, in order to switch ON or OFF the FETs of the motor drive circuit, control signals of an ON/OFF instruction according to PWM control or control signals to switch OFF all the FETs to stop PWM control are outputted.

Figure 8:
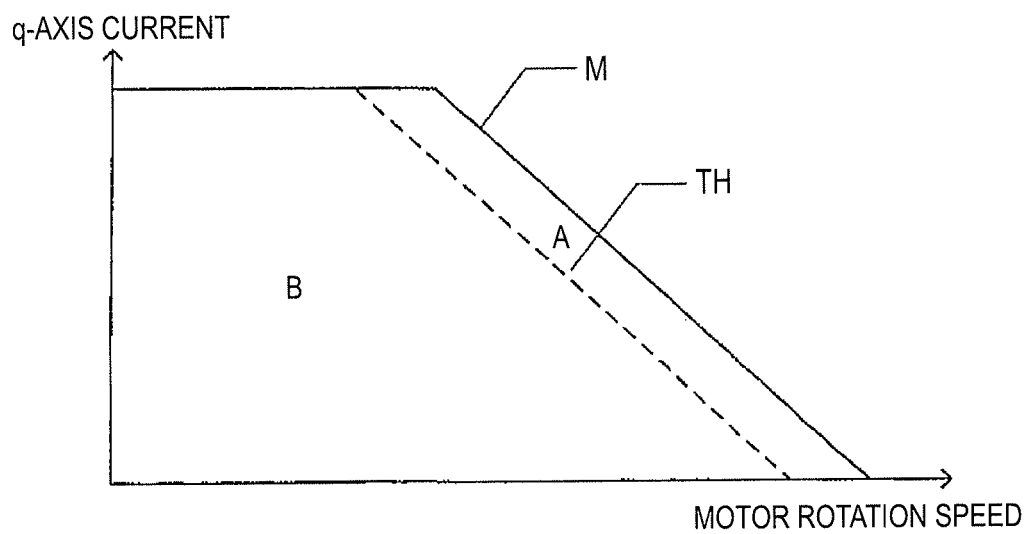
FIG. 8 is a view showing a motor characteristic and a current detectable range in the first embodiment of the invention.

It is known that the motor normally has a characteristic M shown in FIG. 8. Hence, in order to improve detection accuracy of an abnormality, a threshold TH determined by the motor rotation speed and the q-axis current is obtained in advance, and it is evaluated whether the motor is in a region A greater than the threshold TH or a region B smaller than the threshold TH on the basis of the motor rotation speed obtained from a detected motor angle and the detected q-axis current, and the motor drive is stopped when it is found that the motor is in the region B and in a circumstance where currents cannot be detected.

Referring to FIG. 7, it is evaluated in Step S32 whether or not the motor rotation speed is below the predetermined value. However, as is shown in FIG. 8, this evaluation can be made by evaluating whether the region specified by the q-axis current and the motor rotation speed is the region A or B and the flow is allowed to proceed to Step S34 when the region is the region A and to Step S33 when the region is the region B.

As has been described above, the brushless-motor drive apparatus according to the first embodiment of the invention is configured in such a manner that when a motor angle is a predetermined motor angle, when the motor rotation speed is equal to or below a predetermined motor rotation speed and the current-detection possibility evaluating means evaluates that phase currents of the armature windings cannot be detected, or when the motor is within a range of a predetermined motor characteristic and the current-detection possibility evaluating means evaluates that phase currents cannot be detected, the PWM driving means stops the motor drive by switching OFF all the switching elements. Hence, even in a state in which currents cannot be detected, an abnormality in the motor drive apparatus can be detected and the motor drive can be stopped.

Second Embodiment

Figure 9:
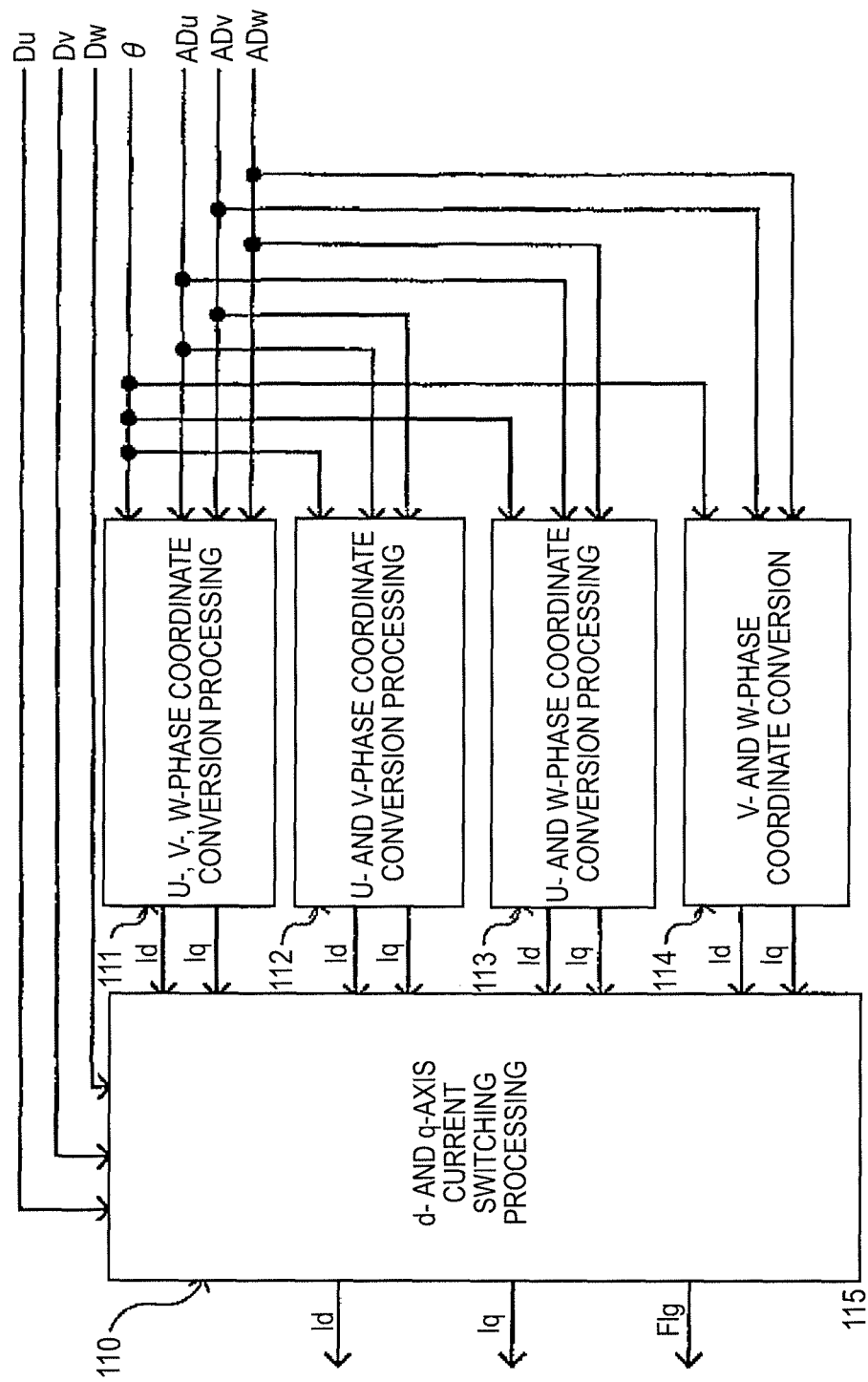
FIG. 9 is a detailed control block diagram of a coordinate converting means according to a second embodiment of the invention.

FIG. 9 shows another method of the coordinate converting means 100 according to a second embodiment of the invention. Referring to FIG. 9, on the assumption that currents can be detected in all the phases, a U-, V-, and W-phase coordinate conversion processing portion 111 calculates Equation (6) below using phase currents ADu, ADv, and ADw obtained from the respective phases and outputs d- and q-axis detection currents denoted by Id and Iq, respectively.

[Mathematical Formula 2]

$$\begin{bmatrix} Id \\ Iq \end{bmatrix} = \sqrt{\frac{2}{3}} \begin{bmatrix} \cos\theta & \cos\left(\theta - \frac{2}{3}\pi\right) & \cos\left(\theta + \frac{2}{3}\pi\right) \\ -\sin\theta & -\sin\left(\theta - \frac{2}{3}\pi\right) & -\sin\left(\theta + \frac{2}{3}\pi\right) \end{bmatrix} \begin{bmatrix} ADu \\ ADv \\ Adw \end{bmatrix} \quad (6)$$

On the assumption that a current in the phase U cannot be detected, a V- and W-phase coordinate conversion processing portion 114 calculates Equation (7) below using phase currents ADv and ADw obtained from the rest of two phases, and outputs d- and q-axis detection currents denoted by Id and Iq, respectively.

[Mathematical Formula 3]

$$\begin{bmatrix} Id \\ Iq \end{bmatrix} = \sqrt{2} \begin{bmatrix} \sin\left(\theta - \frac{\pi}{3}\right) & -\sin\left(\theta + \frac{\pi}{3}\right) \\ \cos\left(\theta - \frac{\pi}{3}\right) & -\cos\left(\theta + \frac{\pi}{3}\right) \end{bmatrix} \begin{bmatrix} ADv \\ ADw \end{bmatrix} \quad (7)$$

On the assumption that a current in the phase V cannot be detected, a U- and W-phase coordinate conversion processing portion 113 calculates Equation (8) below using phase currents ADu and ADw obtained from the rest of two phases, and outputs d- and q-axis detection currents denoted by Id and Iq, respectively.

[Mathematical Formula 4]

$$\begin{bmatrix} Id \\ Iq \end{bmatrix} = \sqrt{2} \begin{bmatrix} -\sin\left(\theta - \frac{\pi}{3}\right) & -\sin\theta \\ -\cos\left(\theta - \frac{\pi}{3}\right) & -\cos\theta \end{bmatrix} \begin{bmatrix} ADu \\ ADw \end{bmatrix} \quad (8)$$

On the assumption that a current in the phase W cannot be detected, a U- and V-phase coordinate conversion processing portion 112 calculates Equation (9) below using phase currents ADu and ADv obtained from the rest of two phases, and outputs d- and q-axis detection currents denoted by Id and Iq, respectively.

[Mathematical Formula 5]

$$\begin{bmatrix} Id \\ Iq \end{bmatrix} = \sqrt{2} \begin{bmatrix} \sin\left(\theta + \frac{\pi}{3}\right) & \sin\theta \\ \cos\left(\theta + \frac{\pi}{3}\right) & \cos\theta \end{bmatrix} \begin{bmatrix} ADu \\ ADv \end{bmatrix} \quad (9)$$

In a case where currents in the three phases can be detected, a d- and q-axis current switching processing portion 110 selects the d- and q-axis currents Id and Iq obtained in the U-, V-, and W-phase coordinate conversion processing portion 111.

In a case where a current in the phase U alone cannot be detected, the d- and q-axis currents Id and Iq obtained in the V- and W-phase coordinate conversion processing portion 114 are selected.

In a case where a current in the phase V alone cannot be detected, the d- and q-axis currents Id and Iq obtained in the U- and W-phase coordinate conversion processing portion 113 are selected.

In a case where a current in the phase W alone cannot be detected, the d- and q-axis currents Id and Iq obtained in the V- and W-phase coordinate conversion processing portion 112 are selected. In a case where currents in two phases or all the phases cannot be detected, coordinate conversion to Id and Iq is not performed and last values are used.

Figure 10:
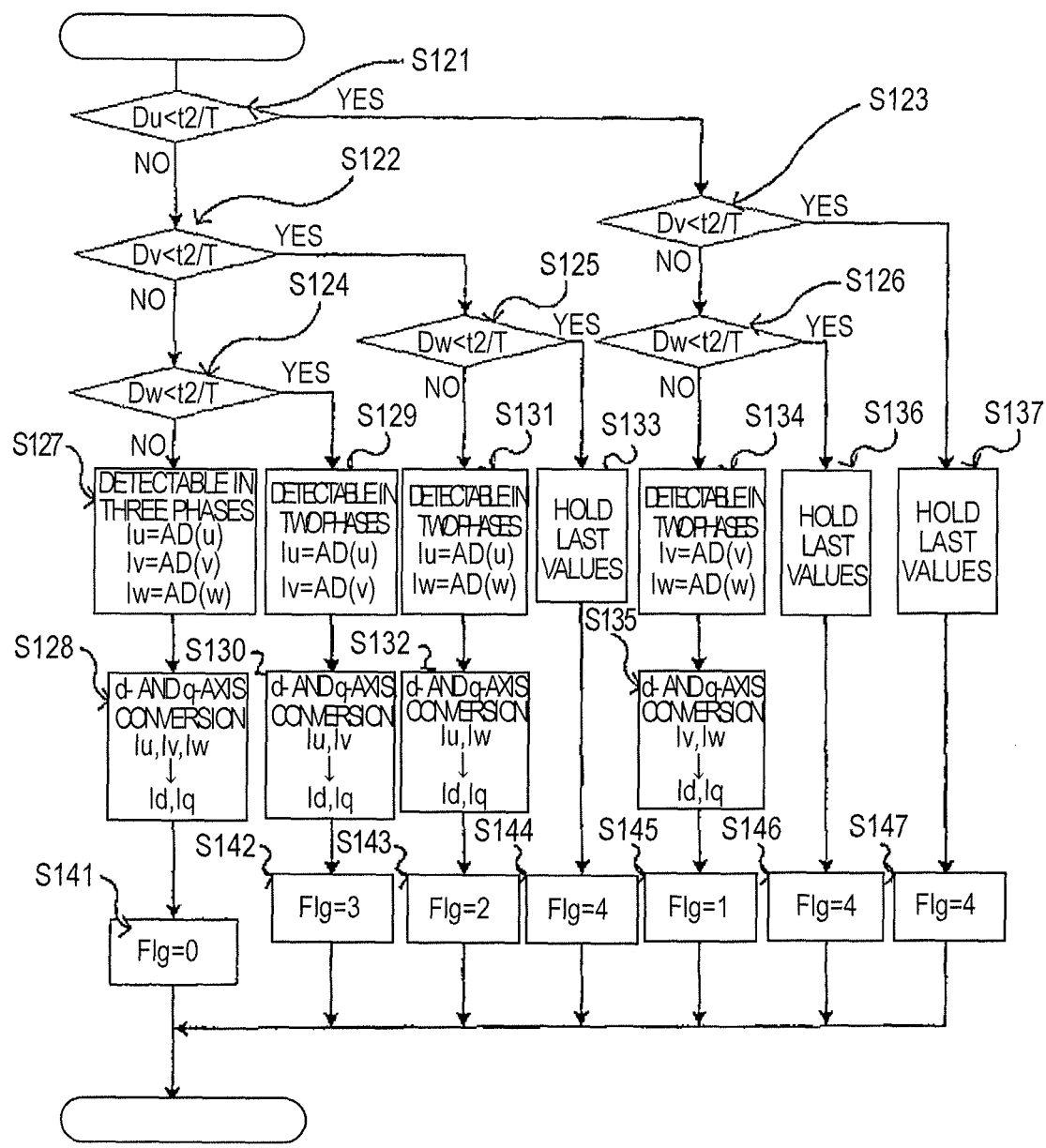
FIG. 10 is a flowchart depicting processing of current detection in the second embodiment of the invention.

The processing above is depicted by the flowchart of FIG. 10.

In Step S121, a duty ratio of the phase U, Du, is compared with t2/T to evaluate whether or not a current can be detected. When a current can be detected, the flow proceeds to Step S122. When it is evaluated that a current cannot be detected, the flow proceeds to Step S123.

In Step S122, a duty ratio of the phase V, Dv, is compared with t2/T to evaluate whether or not a current can be detected. When a current can be detected, the flow proceeds to Step S124. When it is evaluated that a current cannot be detected, the flow proceeds to Step S125.

In Step S123, the duty ratio of the phase V, Dv, is compared with t2/T to evaluate whether or not a current can be detected. When a current can be detected, the flow proceeds to Step S126. When it is evaluated that a current cannot be detected, the flow proceeds to Step S137.

In Step S124, a duty ratio of the phase W, Dw, is compared with t2/T to evaluate whether or not a current can be detected. When a current can be detected, the flow proceeds to Step S127. When it is evaluated that a current cannot be detected, the flow proceeds to Step S129.

In Step S125, the duty ratio of the phase W, Dw, is compared with t2/T to evaluate whether or not a current can be detected. When a current can be detected, the flow proceeds to Step S131. When it is evaluated that a current cannot be detected, the flow proceeds to Step S133.

In Step S126, the duty ratio of the phase W, Dw, is compared with t2/T to evaluate whether or not a current can be detected. When a current cannot be detected, the flow proceeds to Step S134. When it is evaluated that a current cannot be detected, the flow proceeds to Step S136.

In Step S127, because currents in all the three phases can be detected, signals ADu, ADv, and ADw detected by the current detecting means are used intact.

In Step S128, Equation (6) above is calculated.

In Step S129, because a current in the phase W cannot be detected, signals ADu and ADv detected by the current detecting means are used intact for the phases U and V.

In Step S130, Equation (9) above is calculated.

In Step S131, because a current in the phase V cannot be detected, signals ADu and ADw detected by the current detecting means are used intact for the other phases U and W.

In Step S132, Equation (8) above is calculated.

In Step S133, it is found that currents in two phases cannot be detected, that is, a current only in one phase can be detected. Hence, last values of the d- and q-axis detection currents are used.

In Step S134, because a current in the phase U cannot be detected, signals ADv and ADw detected by the current detecting means are used intact for the other phases V and W.

In Step S135, Equation (7) above is calculated.

In Step S136, it is found that currents in two phases cannot be detected, that is, a current only in one phase can be detected. Hence, last values of the d- and q-axis detection currents are used.

In Step S137, it is found that currents in two or more phases cannot be detected, that is, currents in two phases or all phases cannot be detected. Hence, last values of the d- and q-axis detection currents are used.

In Step S141, because it is a state in which currents in all phases can be detected, Flg=0 is set.

In Step S142, because it is a state in which a current in the phase W cannot be detected, Flg=3 is set.

In Step S143, because it is a state in which a current in the phase V cannot be detected, Flg=2 is set.

In Step S144, because it is a state in which currents in two or more phases cannot be detected, Flg=4 is set.

In Step S145, because it is a state in which a current in the phase U cannot be detected, Flg=1 is set.

In Step S146, because it is a state in which currents in two or more phases cannot be detected, Flg=4 is set.

In Step S147, because it is a state in which currents in two or more phases cannot be detected, Flg=4 is set.

As has been described, according to the second embodiment of the invention, the brushless-motor has armature windings formed of three phases U, V, and W. The the calculation processing means includes: a first coordinate converting means for converting the detection currents detected by the current detecting means to a biaxial current made up of a d-axis current indicating a current in a magnetic flux direction and a q-axis current indicating a current in a torque direction; a target voltage calculating means for obtaining a biaxial target voltage from a biaxial target current value and a biaxial detection current value obtained by the first coordinate converting means; and a three-phase converting means (second coordinate converting means) for converting the biaxial target voltage obtained by the target voltage calculating means to voltage command values of three phases. When the current-detection possibility evaluating means evaluates that currents in all three phases flowing through the armature windings of the respective phases can be detected, detection currents in the phases U, V, and W are converted to the biaxial current by the first coordinate converting means. When the current-detection possibility evaluating means evaluates that a current in one phase cannot be detected, the current in the phase in which the current cannot be detected is obtained from currents in the other two phases in which the currents can be detected, and the detection currents in the phases U, V, and W are converted to the biaxial current by the first coordinate converting means. When the current-detection possibility evaluating means evaluates that currents in two or more phases cannot be detected, the d-axis and q-axis currents obtained by the first coordinate converting means last time are used for a calculation of the voltage command values. Hence, even in a case where a current only in one phase can be detected and respective phase currents cannot be estimated, it becomes possible to calculate detection values of the respective phase currents and convert the detection values to a biaxial current. Accordingly, because there is no need to limit duty ratios of the respective phases to a range within which currents can be detected, duty ratios can be used to the greatest extent possible.

Also, because a calculation can be carried out by also performing a coordinate conversion, it becomes possible to reduce a processing load on the calculation processing means.

Incidentally, when voltages applied to the armature windings, that is to say, amplitude of the duty ratios increase, currents can no longer be detected but not uniformly. Because voltages act on the armature windings depending on the phases, a region in which a current can no longer be detected varies with the motor angle. As is shown in FIG. 11, when amplitude of the duty ratios is small as in a region A, currents can be detected in all the phases.

When amplitude of the duty ratios increases, the circumstance changes to a circumstance where a currents in one phase cannot be detected in regions B through D. In this instance, a phase in which a current cannot be detected is different in each of the regions B, C, and D.

When amplitude of the duty ratios increases further, currents in two phases can no longer be detected in a region E.

Figure 11:
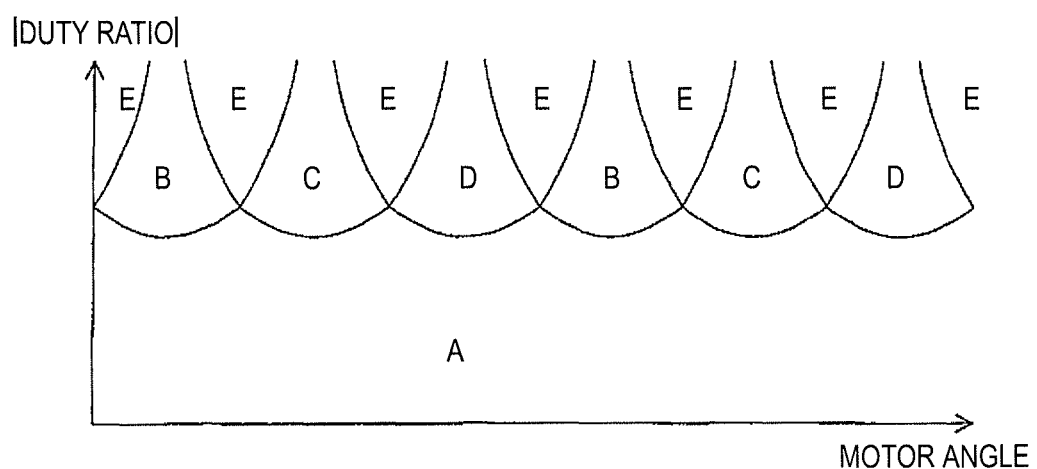
FIG. 11 is a view showing a motor angle and a current detectable range in the second embodiment of the invention.

Hence, by confirming a relation between a state in which a current cannot be detected as shown in FIG. 11 and a motor angle in such a state, it becomes possible to detect an abnormality in the motor drive apparatus.

Figure 12:
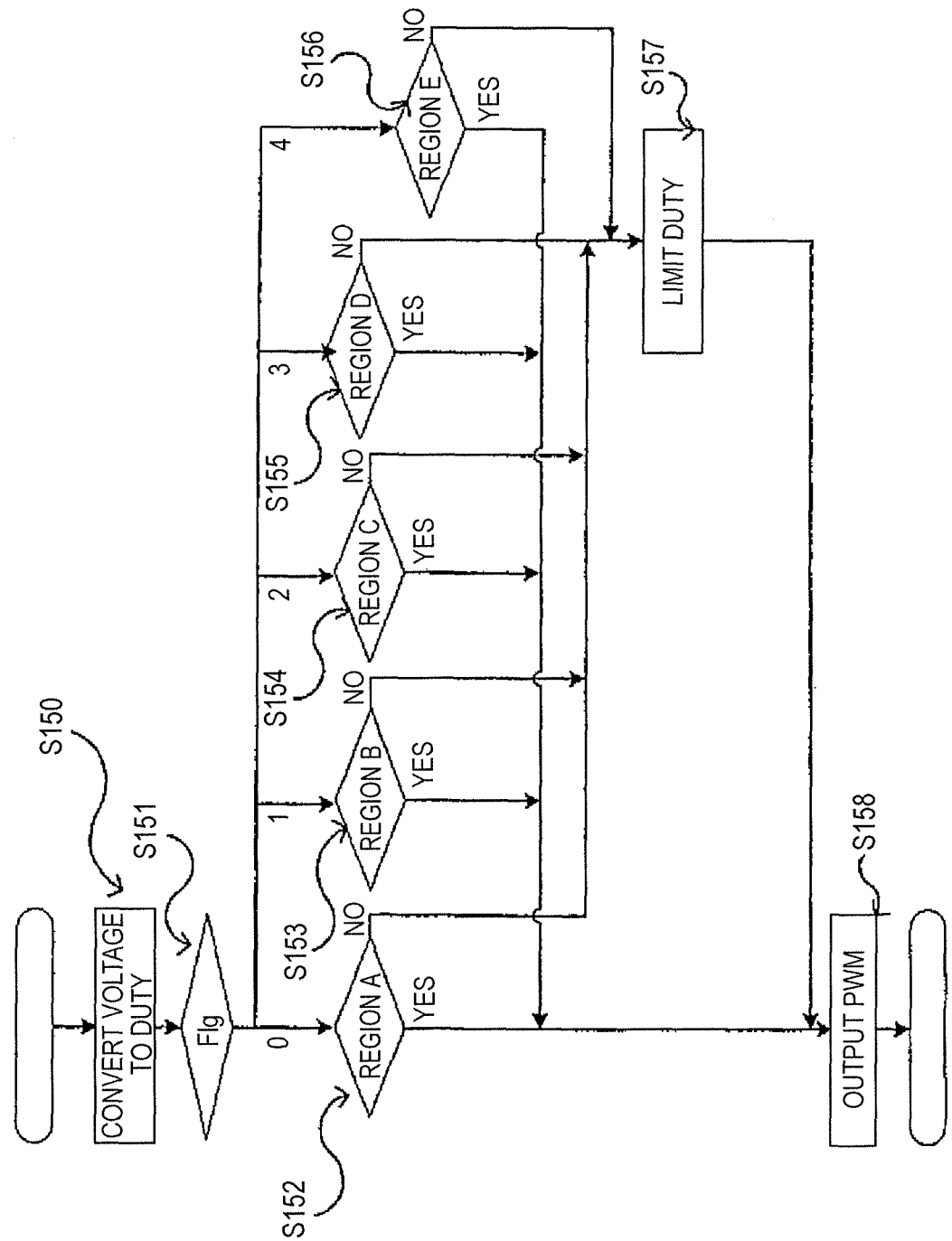
FIG. 12 is a flowchart depicting processing at the occurrence of an abnormality in the motor drive apparatus according to the second embodiment of the invention.

The content above is processed in the PWM driving means 4 and this processing is depicted by the flowchart of FIG. 12.

Referring to FIG. 12, in Step S150, specified voltages of the respective phases are converted to duties.

In Step S151, the current undetectable state present flag Flg obtained in the processing of FIG. 10 is checked. When Flg exhibits 0, the flow proceeds to Step S152, and when Flg exhibits 1, 2, 3, and 4, the flow proceeds to Step S153, Step S154, Step S155, and Step S156, respectively.

In Step S152, whether the duty ratios are in the region A is evaluated from the motor angle. When the duty ratios are in the region A, the flow proceeds to Step S158; otherwise, the flow proceeds to Step S157.

In Step S153, whether the duty ratios are in the region B is evaluated from the motor angle. When the duty ratios are in the region B, the flow proceeds to Step S158; otherwise, the flow proceeds to Step S157.

In Step S154, whether the duty ratios are in the region C is evaluated from the motor angle. When the duty ratios are in the range C, the flow proceeds to Step S158; otherwise, the flow proceeds to Step S157.

In Step S155, whether the duty ratios are in the region D is evaluated from the motor angle. When the duty ratios are in the range D, the flow proceeds to Step S158; otherwise, the flow proceeds to Step S157.

In Step S156, whether the duty ratios are in the region E is evaluated from the motor angle. When the duty ratios are in the region E, the flow proceeds to Step S158; otherwise, the flow proceeds to Step S157.

In Step S157, the duty ratios obtained in Step S150 are limited and set to be t2/T or higher. With these duties, the duty ratios can be forcedly switched to a region in which currents can be detected. In other words, it becomes possible to detect currents by changing PWM drive signals so as to extend an ON time of the lower FETs shown in the first embodiment above.

Accordingly, it becomes possible to detect currents, and an abnormality can be evaluated by detecting the currents.

Also, as with the method described in the first embodiment above, there is no need to stop the motor drive, and although voltages to be applied to the armature windings are reduced, the motor drive can be continued. Also, in a case where the duty ratios are limited, duty ratios may be limited phase by phase or it becomes possible to detect currents in all the phases by limiting the duty ratios of all the phases at the same time.

In Step S158, the duty ratios are outputted to the FET drive circuits as PWM control signals to drive the FET drive circuits to switch ON/OFF.

As has been described in the first embodiment above, the motor is rotating when currents cannot be detected.

Hence, the motor angle keeps varying and the regions shown in FIG. 11 change constantly. In other words, a state in which currents cannot be detected does not last long, and a current detectable state and a current undetectable state change from one to the other with a motor rotation speed.

Hence, instead of evaluating an abnormality from the motor angle, it may be configured in such a manner that a time over which a current undetectable state continues is measured and a predetermined value, for example, a time corresponding to a motor rotation speed is set, so that an abnormality is evaluated when the current undetectable state has continued for the set time or more.

Figure 13:
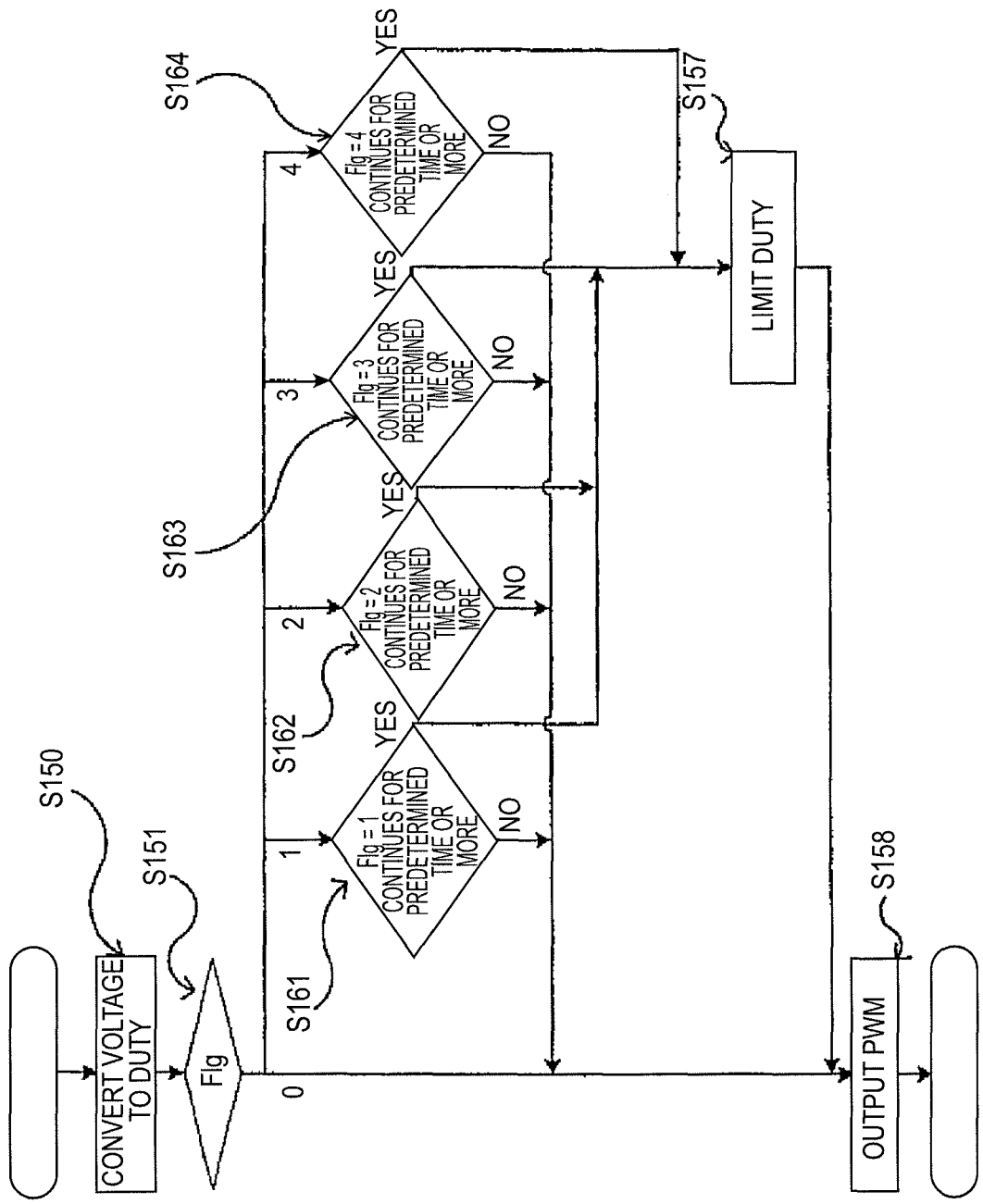
FIG. 13 is a flowchart depicting another example of the processing at the occurrence of an abnormality in the motor drive apparatus according to the second embodiment of the invention.
Figure 14:
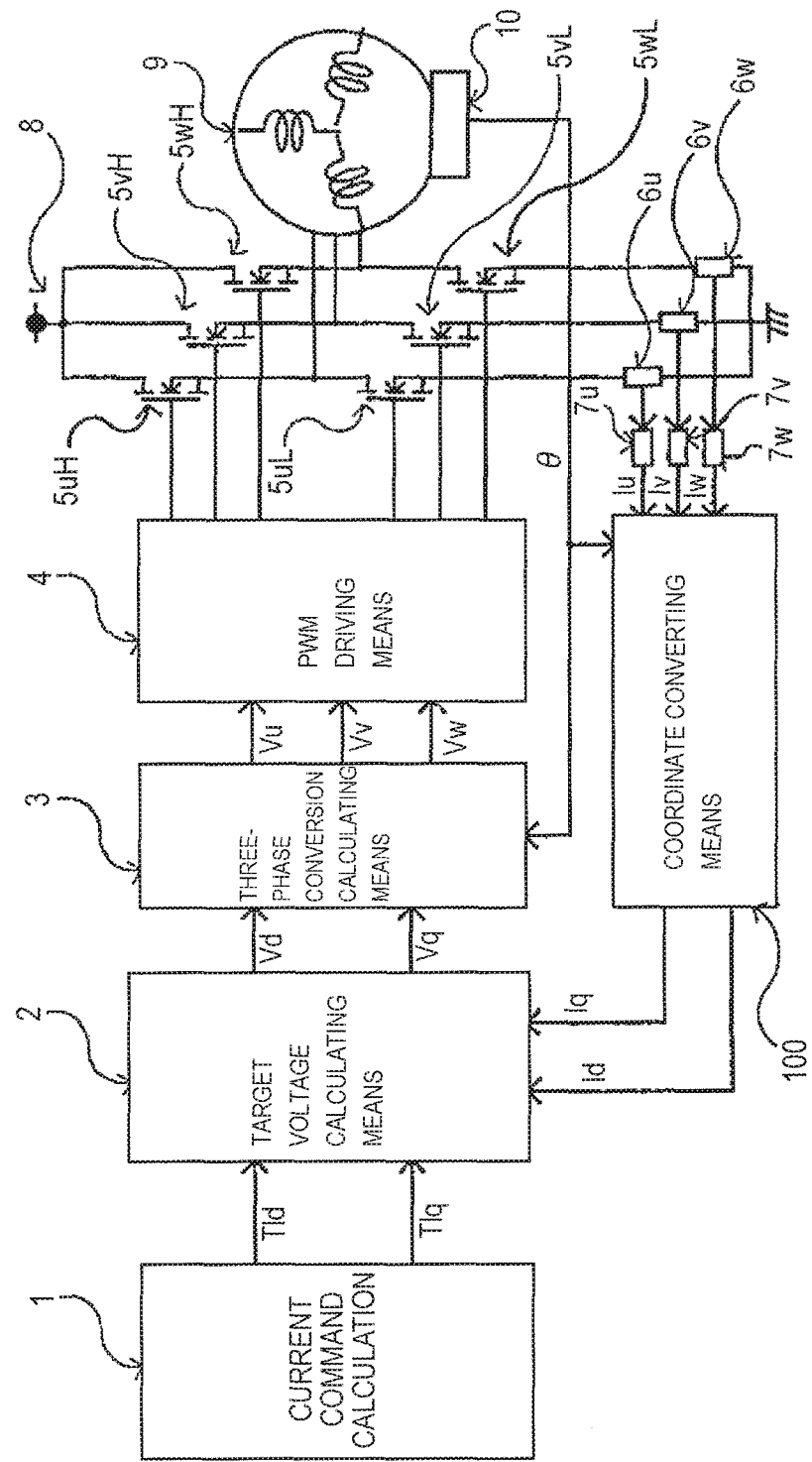
FIG. 14 is a view schematically showing a configuration of an example of an apparatus in the related art.

Steps S152 through S156 of the flowchart shown in FIG. 12 to evaluate an abnormality may be replaced by processing to check whether respective states continue for a predetermined time, and this replacement is depicted by the flowchart of FIG. 13. As is shown in FIG. 13, even when the abnormality evaluating steps are replaced by Steps S161 through S164, the same function and advantage can be achieved.

As has been described, according to the second embodiment of the invention, when a state in which currents cannot be detected continues for a predetermined time in the current-detection possibility evaluating means, the PWM driving means outputs a drive signal that extends an ON period of the second switching element of a phase in which a current cannot be detected so that a phase current can be detected. Hence, in a state in which the motor drive is continued using last detection currents, it becomes possible to prevent a state in which an abnormality of the motor drive apparatus cannot be detected.

Also, when a state in which currents cannot be detected continues for a second predetermined time in the current-detection possibility evaluation means, the PWM driving means outputs drive signals that extend an ON period of the second switching elements of all the phases. Hence, even when the motor drive apparatus fails, not only does it become possible to prevent a state in which a failure cannot be detected, but it also become possible to perform the motor drive smoothly by lowering all outputs.

Also, it may be configured in such a manner that a means for detecting an angle of the magnetic pole position of the brushless motor is provided, and in a case where it is evaluated by the current-detection possibility evaluating means that phase currents cannot be detected when the motor angle is a predetermined angle, duty ratios are limited as in Step S157 on the same ground for the evaluation described in Steps S161 through S164 of FIG. 13, so that drive signals that extend an ON period of the second switching elements are outputted. Even when configured in this manner, the same advantage can be achieved.

Further, it may be configured in such a manner that a means for calculating a motor rotation speed by angle detection is provided, and in a case where it is evaluated by the current-detection possibility evaluation means that phase currents cannot be detected when the motor rotation speed is equal to or below a predetermined motor rotation speed, the PWM driving means outputs drive signals that extend an ON period of all the second switching elements. Even when configured in this manner, too, not only does it become possible to prevent a state in which an abnormality of the motor drive apparatus cannot be detected, and it also becomes possible to perform the motor drive smoothly by lowering all outputs.

Furthermore, it may be configured in such a manner that in a case where it is evaluated by the current-detection possibility evaluating means that phase currents cannot be detected when the motor is within a range of a predetermined motor characteristic, the PWM driving means outputs drive signals that extend an ON period of all the second switching elements. When configured in this manner, the same advantages can be achieved.

INDUSTRIAL APPLICABILITY

The invention provides a brushless-motor drive apparatus suitably used for example, for an electrical power steering apparatus installed to a vehicle.

DESCRIPTION OF NUMERAL REFERENCES AND SIGNS

1: target current command calculating means
2: target voltage calculating means (PI control calculating means)
3: three-phase conversion calculating means
4: PWM driving means
5H (5$u$H, 5$v$H, and 5$w$H): first switching elements (FETs)
5L (5$u$L, 5$v$L, and 5$w$L): second switching elements (FETs)
6 (6$u$, 6$v$, and 6$w$): current detecting means
9: armature windings of brushless motor
10: position sensor
100: coordinate converting means

The invention claimed is:
1. A brushless-motor drive apparatus comprising:
a drive circuit of a brushless motor, the drive circuit including switching element pairs formed of first switching elements disposed on a power supply side and second switching elements disposed on a ground side connected in series in each pair;
a current detector configured to detect currents flowing through armature windings of the brushless motor during periods when the second switching elements are ON;
a calculation processor configured to compare a target current value to drive the brushless motor and current values of the currents detected by the current detector, and calculate voltage command values to be applied to the armature windings of the brushless motor based on deviations between the target current value and the current values of the detected currents; and
a PWM driver configured to control ON and OFF switching of the first and second switching elements by generating drive signals based on the voltage command values,
wherein the calculation processor includes a current-detection possibility evaluator configured to evaluate whether the currents flowing through the armature windings of respective phases of the brushless motor can be detected according to operating states of the first and second switching elements for the respective phases,
when the current-detection possibility evaluator evaluates that the currents cannot be detected, the calculation processor is further configured to obtain the voltage command values by comparing the target current value with the current values which have been detected before and continue a motor drive, and
the current detector comprises resistors, each of which is connected between a respective phase of three phases of the brushless motor and a ground,
wherein, in response to the evaluating that the currents in all of the three phases can be detected, the calculation processor calculates the voltage command values, to be applied to the armature windings, from the detected currents in all of the three phases,
in response to the evaluating that the current in one of the three phases cannot be detected, the calculation processor obtains the current in the one of the three phases in which the current cannot be detected from the detected currents in other two phases, of the three phases, in which the currents can be detected, and calculates the voltage command values, to be applied to the armature windings, from the obtained current of the one of the three phases and the detected currents in the other two phases, and
in response to the evaluating that the currents in at least two phases of the three phases cannot be detected, the calculation processor calculates the voltage command values, to be applied to the armature windings, based on the deviations between the target current value and the current values having been detected in the at least two phases in a last current detection cycle and stored.

2. The brushless-motor drive apparatus according to claim 1, wherein the brushless motor has the armature windings formed of phases U, V, and W, and the calculation processor further includes:
a first coordinate converter configured to convert the detected currents to a biaxial current made up of a d-axis current indicating a current in a magnetic flux direction and a q-axis current indicating a current in a torque direction;
a target voltage calculator configured to obtain a biaxial target voltage from a biaxial target current value and a biaxial detection current value obtained by the first coordinate converter; and
a three-phase converter configured to convert the biaxial target voltage to the voltage command values of the three phases,
wherein, when the current-detection possibility evaluator evaluates that the currents in all three phases can be detected, the detected currents in the phases U, V, and W are converted to the biaxial current by the first coordinate converter,
when the current-detection possibility evaluator evaluates that the current in the one of the three phases cannot be detected, the current in the one of the three phases in which the current cannot be detected is obtained from the currents in the other two phases in which the currents can be detected, and the obtained current of the one of the three phases and the detected currents in the other two phases are converted to the biaxial current by the first coordinate converter, and
when the current-detection possibility evaluator evaluates that the currents in the at least two phases cannot be detected, the d-axis current and the q-axis current obtained by the first coordinate converter in the last current detection cycle are used for a calculation of the voltage command values.

3. The brushless-motor drive apparatus according to claim 2, wherein:
when the current-detection possibility evaluator evaluates that the currents in all three phases can be detected, the calculation processor converts the detected currents in the phases U, V, and W to the biaxial current using the first coordinate converter;
when the current-detection possibility evaluator evaluates that a current in the phase U cannot be detected, the calculation processor converts the detected currents in the phases V and W to the biaxial current;
when the current-detection possibility evaluator evaluates that a current in the phase V cannot be detected, the calculation processor converts the detected currents in the phases U and W to the biaxial current;
when the current-detection possibility evaluator evaluates that a current in the phase W cannot be detected, the calculation processor converts the detected currents in the phases U and V to the biaxial current; and
when the current-detection possibility evaluator evaluates that the currents in the at least two phases cannot be detected, the d-axis current and the q-axis current obtained by last coordinate conversion are used.

4. The brushless-motor drive apparatus according to claim 1, wherein:
when a state in which the currents cannot be detected continues for a predetermined time, the PWM driver outputs a drive signal that extends an ON period of the second switching element of a phase in which a current cannot be detected, so that a phase current can be detected.

5. The brushless-motor drive apparatus according to claim 1, wherein:
when a state in which the currents cannot be detected continues for a second predetermined time, the PWM driver is configured to output drive signals that extend an ON period of the second switching elements of all of the phases.

6. The brushless-motor drive apparatus according to claim 1, further comprising:
an angle detector configured to detect an angle of a magnetic pole position of the brushless motor,
wherein, in a case where the current-detection possibility evaluator evaluates that phase currents cannot be detected when the angle is a predetermined motor angle, the PWM driver is configured to output a drive signal that extends an ON period of the second switching element of a phase in which a current cannot be detected, so that a phase current can be detected.

7. The brushless-motor drive apparatus according to claim 1, further comprising:
an angle detector configured to detect an angle of a magnetic pole position of the brushless motor,
wherein, in a case where the current-detection possibility evaluator evaluates that phase currents cannot be detected when the angle is a predetermined motor angle, the PWM driver is configured to output drive signals that extend an ON period of all of the second switching elements.

8. The brushless-motor drive apparatus according to claim 1, further comprising:
a motor rotation speed calculator configured to calculate a motor rotation speed based on an angle detection,
wherein, in a case where the current-detection possibility evaluator evaluates that phase currents cannot be detected when the motor rotation speed is equal to or below a predetermined rotation speed, the PWM driver is configured to output drive signals that extend an ON period of all of the second switching elements.

9. The brushless-motor drive apparatus according to claim 1, wherein:
in a case where the current-detection possibility evaluator evaluates that phase currents cannot be detected when the brushless motor is within a range of a predetermined motor characteristic, the PWM driver is configured to output drive signals that extend an ON period of all of the second switching elements.

10. The brushless-motor drive apparatus according to claim 1, wherein:
when a state in which the currents cannot be detected continues for a second predetermined time, the PWM driver is configured to stop the motor drive by switching OFF the first and second switching elements.

11. The brushless-motor drive apparatus according to claim 1, further comprising:
an angle detector configured to detect an angle of magnetic pole position of the brushless motor,
wherein, in a case where the current-detection possibility evaluator evaluates that phase currents cannot be detected when the angle is a predetermined motor angle, the PWM driver is configured to stop the motor drive by switching OFF the first and second switching elements.

12. The brushless-motor drive apparatus according to claim 1, further comprising:
a motor rotation speed calculator configured to calculate a motor rotation speed based on an angle detection,
wherein, in a case where the current-detection possibility evaluator evaluates that phase currents cannot be detected when the motor rotation speed is equal to or below a predetermined rotation speed, the PWM driver is configured to stop the motor drive by switching OFF the first and second switching elements.

13. The brushless-motor drive apparatus according to claim 1, wherein:
in a case where the current-detection possibility evaluator evaluates that phase currents cannot be detected when the brushless motor is within a range of a predetermined motor characteristic, the PWM driver is configured to stop the motor drive by switching OFF the first and second switching elements.

14. The brushless-motor drive apparatus according to claim 1, wherein the calculation processor is configured to perform a current feedback control by calculating the voltage command values to be applied to the armature windings based on the deviations between the target current value and the current values for the respective phases detected by individual resistors of the current detector.

15. A brushless-motor drive apparatus comprising:
a drive circuit of a brushless motor, the drive circuit including switching element pairs formed of first switching elements disposed on a power supply side and second switching elements disposed on a ground side connected in series in each pair;
a current detector configured to detect currents flowing through armature windings of the brushless motor during periods when the second switching elements are ON;
a calculation processor configured to compare a target current value to drive the brushless motor and current values of the currents detected by the current detector, and calculate voltage command values to be applied to the armature windings of the brushless motor based on deviations between the target current value and the current values of the detected currents; and a PWM driver configured to control ON and OFF switching of the first and second switching elements by generating drive signals based on the voltage command values, wherein the calculation processor includes a current-detection possibility evaluator configured to evaluate whether the currents flowing through the armature windings of respective phases of the brushless motor can be detected according to operating states of the first and second switching elements for the respective phases, when the current-detection possibility evaluator evaluates that the currents cannot be detected, the calculation processor is further configured to obtain the voltage command values by comparing the target current value with the current values which have been detected before and continue a motor drive, and the current detector comprises resistors, each of which is connected between a respective phase of three phases of the brushless motor and a ground, wherein, in response to the evaluating that the currents in all of the three phases can be detected, the calculation processor calculates the voltage command values, to be applied to the armature windings, from the detected currents in all of the three phases, in response to the evaluating that the current in one of the three phases cannot be detected, the calculation processor obtains the current in the one of the three phases in which the current cannot be detected from the detected currents in other two phases, of the three phases, in which the currents can be detected, and calculates the voltage command values, to be applied to the armature windings, from the obtained current of the one of the three phases and the detected currents in the other two phases, and in response to the evaluating that the currents in at least two phases of the three phases cannot be detected, the calculation processor calculates the voltage command values, to be applied to the armature windings, based on the current values which have been detected in the at least two phases in a last detection cycle and held, and wherein the brushless-motor drive apparatus further comprises:

an angle detector configured to detect an angle of a magnetic pole position of the brushless motor; and a motor rotation speed calculator configured to calculate a motor rotation speed based on the detected angle, wherein, when the current-detection possibility evaluator evaluates that the current in at least one of the three phases cannot be detected while the detected angle is a predetermined motor angle or the motor rotation speed is equal to or below a predetermined rotation speed, the PWM driver is configured to output drive signals that extend an ON period in the second switching element of the at least one of the three phases.

* * * * *